US 8,462,623 B2

(12) United States Patent
Abe et al.

(10) Patent No.: US 8,462,623 B2
(45) Date of Patent: Jun. 11, 2013

(54) BANDWIDTH CONTROL METHOD AND TRANSMISSION EQUIPMENT

(75) Inventors: Tatsuya Abe, Kawasaki (JP); Yoshinari Akakura, Kawasaki (JP); Yuichi Yamagishi, Kawasaki (JP); Norihiro Yoshida, Kawasaki (JP); Hirotaka Yamada, Kawasaki (JP); Kiyoshi Miyano, Kawasaki (JP); Shigemori Ookawa, Kawasaki (JP); Norikazu Hikimochi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1141 days.

(21) Appl. No.: 11/268,348

(22) Filed: Nov. 7, 2005

(65) Prior Publication Data

US 2007/0047578 A1 Mar. 1, 2007

(30) Foreign Application Priority Data

Aug. 29, 2005 (JP) .................................. 2005-248492

(51) Int. Cl.
*H04J 3/16* (2006.01)
(52) U.S. Cl.
USPC ........................ 370/230; 370/395.21; 370/468
(58) Field of Classification Search
USPC ............... 370/230, 395.21, 468, 395.43, 412, 370/392, 401; 709/220, 223, 250; 714/3
See application file for complete search history.

(56) References Cited

U.S. PATENT DOCUMENTS

| | | | |
|---|---|---|---|
| 5,933,422 A * | 8/1999 | Kusano et al. ................. | 370/331 |
| 6,678,275 B1 * | 1/2004 | DeGrandpre et al. ..... | 370/395.7 |
| 6,757,286 B1 * | 6/2004 | Stone ........................ | 370/395.53 |
| 6,826,158 B2 * | 11/2004 | Seaman et al. ................ | 370/254 |
| 6,934,249 B1 * | 8/2005 | Bertin et al. ................... | 370/218 |
| 6,976,087 B1 * | 12/2005 | Westfall et al. ............... | 709/238 |
| 7,336,605 B2 * | 2/2008 | Bruckman et al. ............ | 370/230 |
| 7,414,985 B1 * | 8/2008 | Tedijanto et al. ............. | 370/255 |
| 7,418,000 B2 * | 8/2008 | Bruckman et al. ............ | 370/412 |
| 7,602,726 B1 * | 10/2009 | Sundaresan et al. .......... | 370/237 |

(Continued)

FOREIGN PATENT DOCUMENTS

| JP | 2001-136234 | * | 5/2001 |
|---|---|---|---|
| JP | 2002-9866 A | | 1/2002 |
| WO | WO-2004/086697 | | 10/2004 |
| WO | WO-2004/105276 | | 12/2004 |

OTHER PUBLICATIONS

Zhou Jingli, Guo Hui, Yu Shengsheng, Li Yue, "Aggregation of Multiple Ethernet Links Within Network Subsystem", IEEE, Mar. 2004.*

(Continued)

*Primary Examiner* — Habte Mered
(74) *Attorney, Agent, or Firm* — Fujitsu Patent Center

(57) ABSTRACT

The present invention is comprised for pre-setting bandwidth control information of each user for each of the number of normal physical links which are integrated as a Link Aggregation, recognizing the number of currently normal physical links if a failure, or recovery therefrom, of a physical link which is integrated as the aforementioned Link Aggregation, and carrying out a bandwidth control, for each user traffic, corresponding to the number of the recognized normal physical links by referring to bandwidth control information of each user for each of the number of preset normal physical links, in order to prevent an occurrence of unfairness in usable bandwidth among the users even in the case of a failure occurrence in respective physical links which are logically integrated as a Link Aggregation.

8 Claims, 12 Drawing Sheets

U.S. PATENT DOCUMENTS

| | | | |
|---|---|---|---|
| 7,630,412 B2 * | 12/2009 | Wright et al. | 370/536 |
| 2003/0223428 A1 * | 12/2003 | Gonzalez et al. | 370/395.4 |
| 2005/0030948 A1 * | 2/2005 | Wyatt | 370/392 |
| 2005/0160171 A1 * | 7/2005 | Rabie et al. | 709/227 |
| 2005/0271084 A1 * | 12/2005 | Bruckman et al. | 370/468 |
| 2005/0286537 A1 * | 12/2005 | Shimada | 370/395.53 |
| 2006/0209681 A1 * | 9/2006 | Yamamoto | 370/218 |
| 2006/0242333 A1 * | 10/2006 | Johnsen et al. | 710/30 |

OTHER PUBLICATIONS

"Japanese official communication (Notice of Rejection Ground)", OA in English / Japanese Appln. No. 2005-248492, dated Oct. 7, 2008.

* cited by examiner

| THE NUMBER OF NORMAL PHYSICAL LINKS: 4 LINKS (4Gbps) | USER A | USER B |
|---|---|---|
| | 2Gbps | 2Gbps |
| THE NUMBER OF NORMAL PHYSICAL LINKS: 3 LINKS (3Gbps) | 1.5Gbps | 1.5Gbps |
| THE NUMBER OF NORMAL PHYSICAL LINKS: 2 LINKS (2Gbps) | 1Gbps | 1Gbps |
| THE NUMBER OF NORMAL PHYSICAL LINKS: 1 LINKS (1Gbps) | 0.5Gbps | 0.5Gbps |

FIG. 7B

| LINK USAGE RATIO | USER A | USER B |
|---|---|---|
| | 50% | 50% |
| FOLLOWING ARE BANDWIDTH CONTROL RATE PER USER AUTOMATICALLY SET UP WHEN SETTING THE ABOVE DESCRIBED BANDWIDTH RATIO | | |
| THE NUMBER OF NORMAL PHYSICAL LINKS: 4 LINKS (4Gbps) | 2Gbps | 2Gbps |
| THE NUMBER OF NORMAL PHYSICAL LINKS: 3 LINKS (3Gbps) | 1.5Gbps | 1.5Gbps |
| THE NUMBER OF NORMAL PHYSICAL LINKS: 2 LINKS (2Gbps) | 1Gbps | 1Gbps |
| THE NUMBER OF NORMAL PHYSICAL LINKS: 1 LINKS (1Gbps) | 0.5Gbps | 0.5Gbps |

FIG. 8B

BANDWIDTH CONTROL METHOD AND TRANSMISSION EQUIPMENT

BACKGROUND OF THE INVENTION

1. Field of the Invention

The present invention relates to a telecommunication system adopting Link Aggregation and in particular, a dynamic bandwidth control of user traffic in transmission equipment when a failure occurs in the physical link of the telecommunication system, resulting in a fluctuating number of usable physical links.

2. Description of the Related Art

Link Aggregation, which is a technique for utilizing a plurality of physical links as one logical link, is standardized as IEEE802.3ad. For instance, Link Aggregation makes it possible to bundle eight physical links having 1-Gbps bandwidth for use as an 8-Gbps logical link. As such, Link Aggregation provides a benefit of increasing bandwidth without using high speed physical links. And if failure occurs in some of the physical links, the entirety of the link is operable instead of being interrupted as long as at least one physical link is usable. Therefore the adoption of Link Aggregation enables the implementation of a failure resistant telecommunication system. In the following description, a logical link per se integrated by Link Aggregation is referred to as Link Aggregation or simply LA.

Referring to FIG. 1, let a situation when a failure occurs in a physical link within transmission equipment used for a telecommunication system adopting Link Aggregation be described.

As shown by FIG. 1 conceptually, let it be assumed that users A and B are using a 4.0 Gbps Link Aggregation integrating four ports of physical links, each of which is connected to a 1.0 Gbps port, and that each output data of the users A and B is being shaped. Let it also be assumed that for user A, an input rate of 2.0 Gbps, and for output, a shaping rate of 2.0 Gbps and an actual output rate of 2.0 Gbps is in effect; and for the user B, an input rate of 2.0 Gbps, and for output, a shaping rate of 2.0 Gbps and an actual output rate of 2.0 Gbps is in effect.

In this configuration, if failures occur in two ports out of the four ports as shown by FIG. 1, through Link Aggregation reconfiguration, the number of integrated physical links changes from four to two, resulting in the maximum bandwidth of the Link Aggregation becoming 2.0 Gbps. As such, the maximum bandwidth of the Link Aggregation changes dynamically depending on the failure condition of the respective physical links which are integrated.

A setup value of bandwidth control such as shaping, however, is usually established with an assumption of no failure occurrence in the integrated respective physical links, the pre-established bandwidth control becomes meaningless if a failure occurs in the physical link lowering the maximum bandwidth below the shaping rate.

Because of the above, the bandwidth of the reconfigurated Link Aggregation is occupied by the traffic for the user A, allowing no flow of data signal for the user B in an extreme case, as shown by FIG. 1.

With regard to the above described problem, let Link Aggregation reconfiguration in the case of a failure occurrence in a physical link of conventional transmission equipment be described, while referring to FIGS. 2 and 3.

FIG. 2 illustrates a hardware unit 100 which houses a physical link of transmission equipment and a firmware unit 90 for controlling the hardware unit 100. The firmware unit 90 comprises an external command receiving unit 91, an external command process unit 92, a bandwidth control unit 93, a bandwidth control information setup retention unit 94, a hardware control unit 95, a link failure detection unit 96, an LA reconfiguration control unit 97 and an event notification unit 98.

Note that the terms "bandwidth control setup" and "bandwidth control information setup" are used in the following descriptions, where "bandwidth control setup" means to set a specific setup value, such as a shaping rate "2.0 Gbps" for the user A, as exemplified by FIG. 1, individually in the hardware unit 100, while "bandwidth control information setup" means to set a setup value used for the "bandwidth control setup" in the bandwidth control information setup retention unit 94. The above noted definitions also apply to a later noted description of the present invention.

For instance, as an external command such as a command for a bandwidth control information setup per user is issued, the command is received by the external command receiving unit 91, interpreted by the external command process unit 92, provided to the bandwidth control unit 93, followed by the bandwidth control information setup retention unit 94 setting the bandwidth control information per user to be retained thereby. The bandwidth control unit 93 reads out the bandwidth control information per user retained by the bandwidth control information setup retention unit 94 and instructs the hardware control unit 95 to set a bandwidth control. The hardware control unit 95 sets the instructed bandwidth control setup in the hardware unit 100 and has it execute a bandwidth control per user.

FIG. 3 shows a conventional Link Aggregation reconfiguration flow in the case of a failure occurrence in a physical link.

As a failure occurs in an accommodated physical link, the hardware unit 100 issues an interrupt due to the occurrence of link failure in accordance with some cause and the link failure detection unit 96 receives it. This constitutes a judgment of a link failure cause occurrence becoming "yes" (the step S101 noted in FIG. 3) (simply "S101" hereinafter), so that the link failure detection unit 96 detects failure in units of physical links to judge whether or not an LA reconfiguration cause has occurred (S102).

If the judgment for S102 is "yes", the link failure detection unit 96 notifies the LA reconfiguration control unit 97 of a LA reconfiguration cause occurrence (S103).

The LA reconfiguration control unit 97 instructs the hardware control unit 95 to reconfigurate LA (S104) and the hardware control unit 95 carries out a LA reconfiguration control for the hardware unit 100 (S105).

Meanwhile, the LA reconfiguration control unit 97 notifies maintenance personnel of an LA reconfiguration event by way of the event notification unit 98 (S106).

As described above, coordination between a link reconfiguration control and bandwidth control has not been performed in the conventional method. Because of this, it is possible for a state to occur where user A traffic occupies all the bandwidth resulting in user B' data signal not flowing. As such, there have been cases where unfairness occur in the allotment of usable bandwidth among respective users such as the traffic of a specific user among equal priority users using all the bandwidth, resulting in the traffic of other users being unable to pass through.

A below noted patent document 1 discloses bulk transmission equipment for carrying out bulk communication by using a plurality of links as with the Link Aggregation. The patent document 1 discloses a technique for carrying out bulk communication only on the normal links if a failure occurs in one link of the plurality thereof during bulk communication, while a method of preventing the possibility of an unfair state in usable bandwidth occurring among the respective users is not noted.

[Patent document 1] Japanese Published Patent Application No. 2001-136234

SUMMARY OF THE INVENTION

Accordingly, the problem that the present invention attempts to solve is unfairness in the distribution of usable bandwidth among users even if a failure occurs in respective physical links which are logically integrated as a Link Aggregation.

To that end, the present invention dynamically controls a bandwidth control setup, for each user traffic using a Link Aggregation, in accordance with a variation of the maximum bandwidth of the Link Aggregation integrating physical links.

The present invention also comprises the steps of presetting bandwidth control information of each user for each of the number of normal physical links which are integrated as the Link Aggregation; recognizing the number of currently normal physical links if a failure or a recovery therefrom of physical links which are integrated as the aforementioned Link Aggregation is detected; and carrying out a bandwidth control, for each user traffic, in response to the number of the recognized normal physical links by referring to the preset bandwidth control information of each user for each of the number of the normal physical links.

The present invention makes it possible to avoid an occurrence of unfairness in the distribution of usable bandwidth among users by controlling dynamically a bandwidth control setup for each user traffic even if a failure occurs in respective physical links which are logically integrated as a Link Aggregation.

BRIEF DESCRIPTION OF THE DRAWINGS

FIG. 7B exemplifies a bandwidth control information setup according to the present invention;

FIG. 8B exemplifies a bandwidth control information setup in a fixed ratio according to the present invention;

DESCRIPTION OF THE PREFERRED EMBODIMENTS

Figure 4:
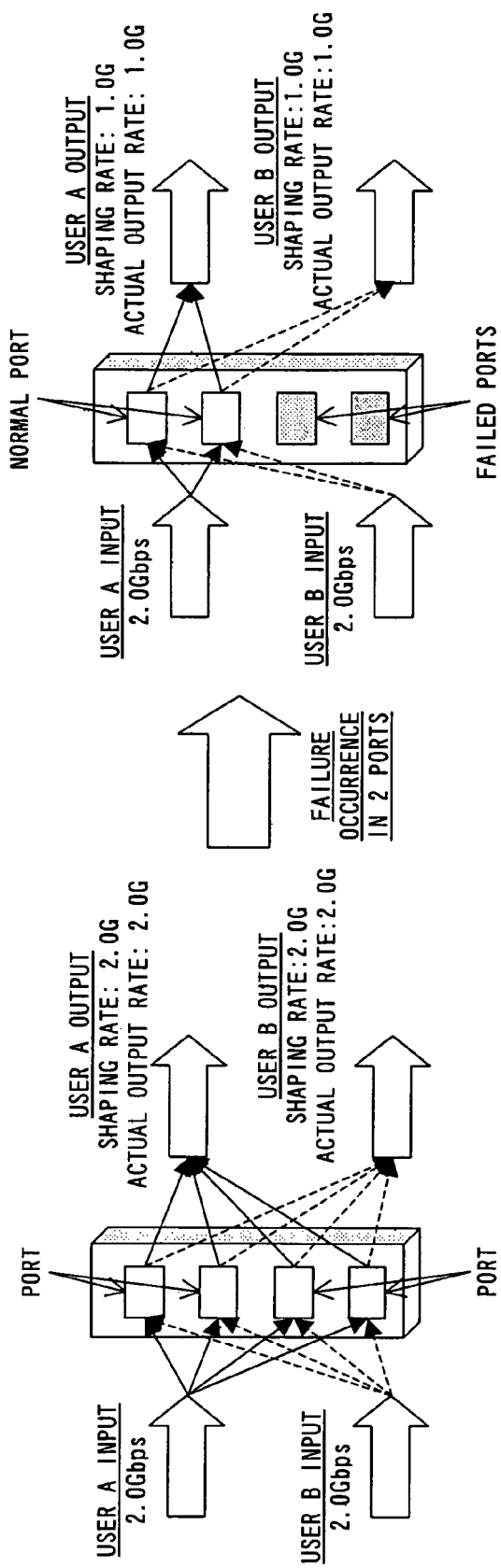
FIG. 4 describes a state at the time of a failure occurrence in physical links constituting an LA in transmission equipment to which the present invention is applied.

FIG. 4 describes conceptually a state at the time of a failure occurrence in physical links in transmission equipment for a telecommunication system adopting Link Aggregation in the case of applying the present invention. The state of the example when normal is the same as that shown by FIG. 1, the only difference is in the case of failure occurrence in the physical link.

Figure 1:
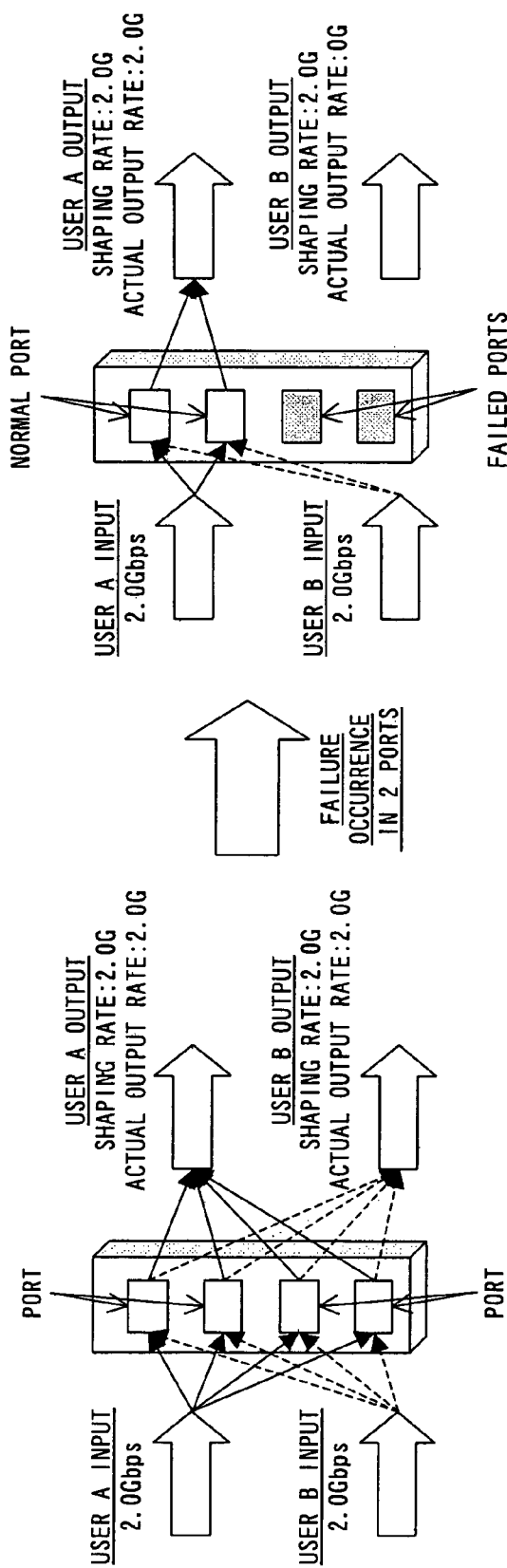
FIG. 1 describes a conventional state at the time of a failure occurrence in physical links constituting an LA (Link Aggregation)

As with the case shown by FIG. 1, if failures occur in two ports out of the four, a Link Aggregation is reconfigurated and the maximum bandwidth of the Link Aggregation becomes 2.0 Gbps. In this event the present invention changes the shaping rates of both users A and B dynamically to 1.0 Gbps, hence it is capable of making the actual output rates also 1.0 Gbps, respectively.

While the example shown by FIG. 4 adopts bandwidth control by shaping, the fundamental feature of the present invention lies in carrying out bandwidth control of each user dynamically in association with a dynamic variation of the maximum bandwidth of the Link Aggregation, and therefore the present invention can be applied to such a bandwidth control (i.e., policing) to simply discard data which is transmitted in excess of the maximum bandwidth, instead of being limited to shaping.

Figure 5:
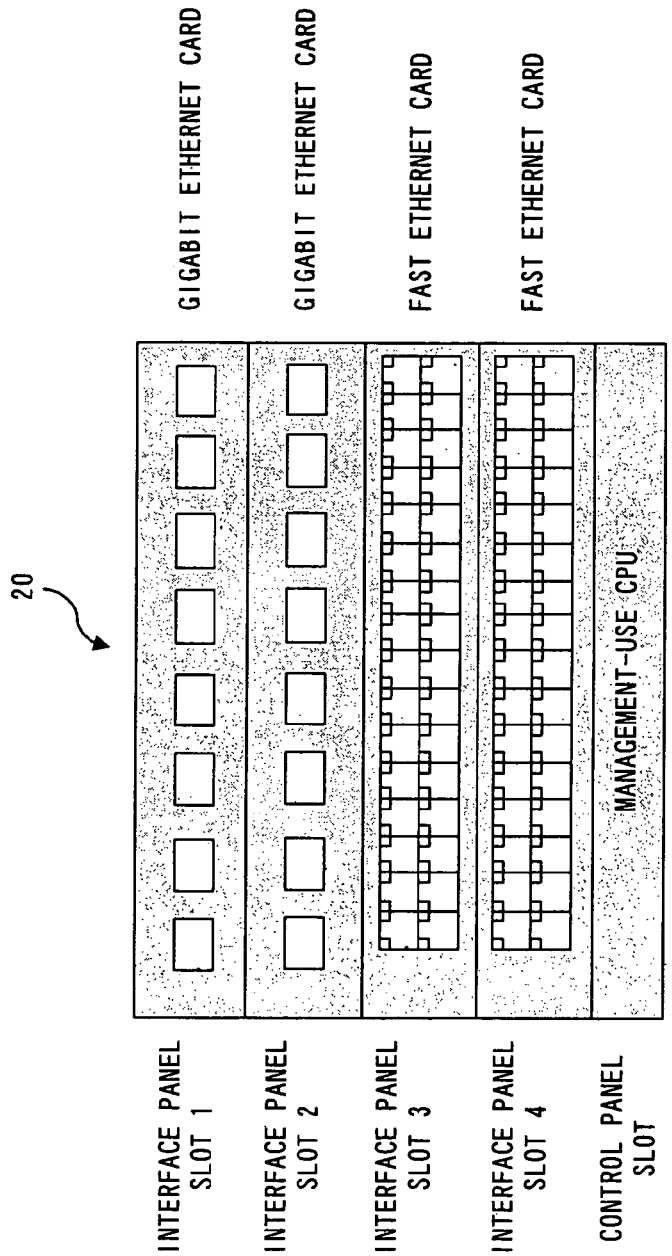
FIG. 5 describes a configuration example of transmission equipment to which the present invention is applied.

FIG. 5 describes a configuration example of representative transmission equipment (i.e., L2SW equipment) to which the present invention is applied. The transmission equipment 20 is furnished with an interface panel for carrying out actual packet transmission by connecting a LAN cable or optical fiber and with a control panel, being equipped with firmware, for controlling and monitoring the interface panel. In the example shown by FIG. 5, slots 1 and 2 are respectively installed with Gigabit Ethernet (registered trademark) cards equipped with eight ports as an interface panel, while slots 3 and 4 are respectively installed with Fast Ethernet (registered trademark) cards equipped with 32 ports. A control panel slot is installed with a board equipped with a management-use CPU which controls and monitors the above described interface panel and executes firmware for accomplishing Link Aggregation.

Figure 6:
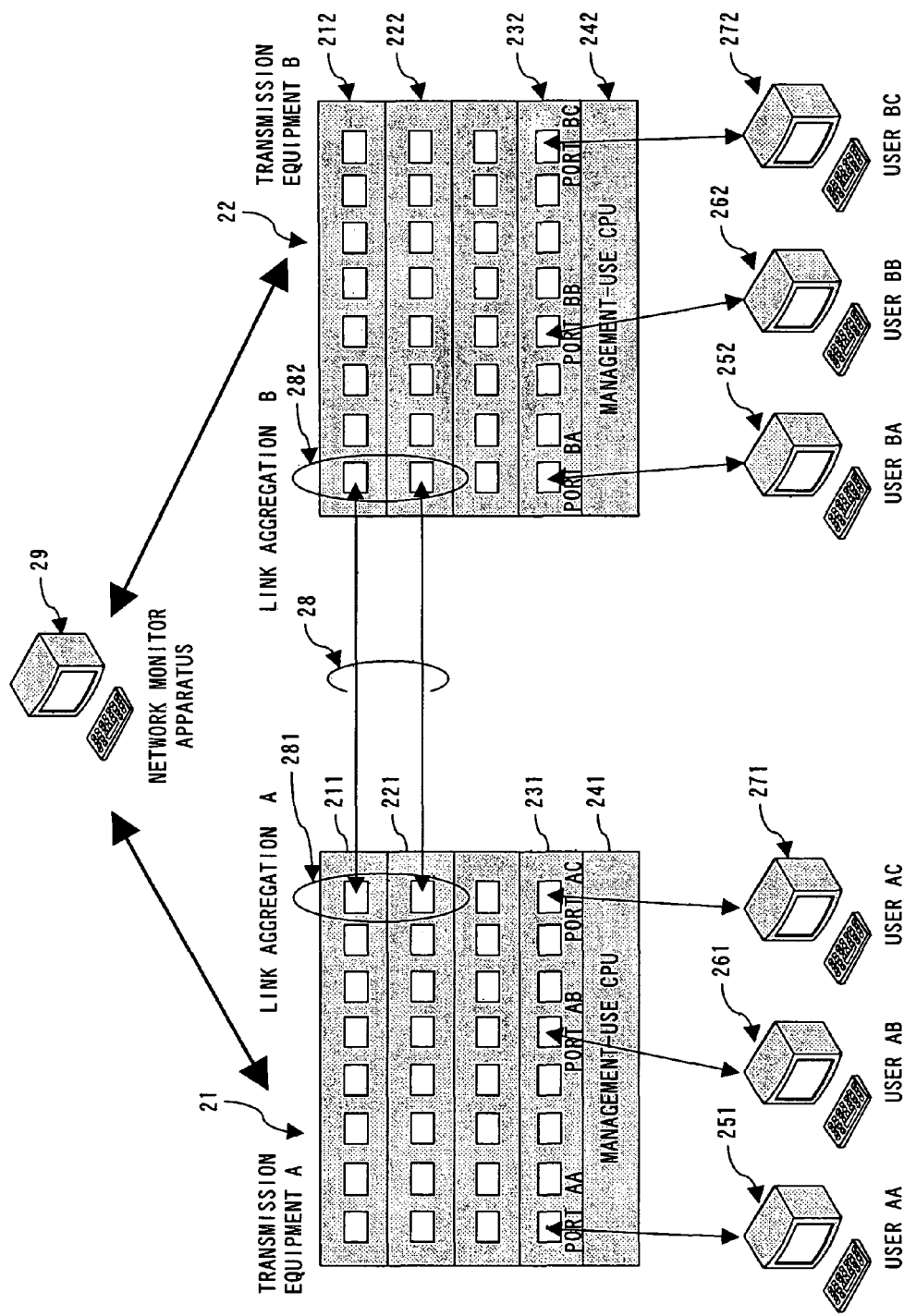
FIG. 6 describes a configuration example of a network to which the present invention is applied.

FIG. 6 describes a configuration example of a representative network using the transmission equipment shown by FIG. 5. The network exemplified by FIG. 6 comprises a transmission equipment A21; a transmission equipment B22; users AA251, AB261 and AC271 accommodated by the transmission equipment A21; users BA252, BB262 and BC272 accommodated by the transmission equipment B22; and a network monitor apparatus 29.

The transmission equipment A21 and B22 are interconnected by a Link Aggregation 28. A Link Aggregation A281, which is a connection point at the transmission equipment A21 of the Link Aggregation 28, is constituted by two ports which are equipped respectively in interface panels 211 and 221, and likewise a Link Aggregation B282, which is a connection point at the transmission equipment B22, is constituted by two ports which are equipped respectively in interface panels 212 and 222. The reason for accommodating the physical links integrated by the Link Aggregation by different interface panels is to enable telecommunication by a physical link accommodated by another interface panel even if all the physical links accommodated by an interface panel become unusable due to a failure thereof.

The transmission equipment A21 accommodates signals from the users AA251, AB261 and AC271 by using ports AA, AB and AC, respectively, which are equipped in an interface panel 231. Signals from the ports AA/AB/AC are routed to the Link Aggregation A281, thereby transmitting signals to the transmission equipment B22 as the opposite equipment.

Likewise, the transmission equipment B22 accommodates signals from the users BA252, BB262 and BC272 by using ports BA, BB and BC, respectively, which are equipped in an interface panel 232. And the transmission equipment B22 receives a signal transmitted from the transmission equipment A21 by way of a Link Aggregation B282 and performs routing for the signal received by way of the Link Aggregation B282 to the ports BA/BB/BC, thereby transmitting the signal from the user of the transmission equipment A21 as the opposite equipment.

The above described signal transmission is enabled bi-directionally, and signal flows are as follows, where they are semi-graphically expressed (N.B.: "↔" denotes bi-directional signal flow):

[Users AA251, AB261 and AC271]↔ [Ports AA, AB and AC]↔ Link Aggregation A281↔ Link Aggregation 28↔ Link Aggregation B282↔ [Ports BA, BB and BC]↔ [Users BA252, BB262 and BC272]

The management-use CPUs 241 and 242 control and monitor the respective interface panels of the applicable transmission equipment, and notify the network monitor apparatus 29 of an event by using the SNMP for example.

The network monitor apparatus 29 is for centrally managing an alarm state and event notification for each transmission equipment accommodated within the network.

The next description is of a dynamic re-setup of bandwidth control according to the present invention.

Figure 7A:
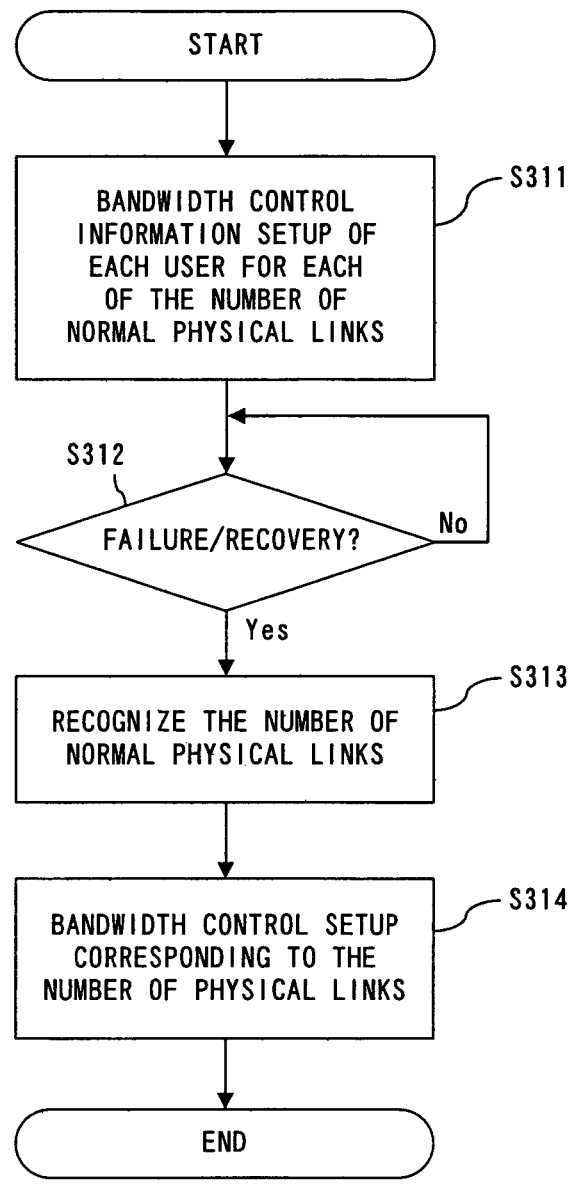
FIG. 7A shows a dynamic bandwidth control setup flow according to the present invention.

FIG. 7A shows a firmware process flow for dynamically setting up a bandwidth control in accordance with Link Aggregation reconfiguration.

First, an initial setup is to set the bandwidth control information of each user for each of the number of normal physical links which are integrated as a Link Aggregation and retain the information as internal information (S311).

Then, at the time of detecting an occurrence of a failure, or recovery therefrom, of a physical link which is integrated as a Link Aggregation (S312), recognize the number of currently normal physical links (S313), refer to the bandwidth control information for each user corresponding to the number of normal physical links which has been pre-set in the step S311 and re-set a suitable bandwidth control setup dynamically for the hardware (S314).

FIG. 7B exemplifies the number of normal physical links pre-set in the step S311 shown by FIG. 7A, that is, the bandwidth control information of each user per the maximum bandwidth of a Link Aggregation. In FIG. 7B, exactly the same bandwidth control information is set for the users A and B, this is just an example, however, and it is of course possible to set a different bandwidth usable for each user if the number of usable physical links decreases, even if each user uses the same capacity of bandwidth when all the physical links are normal.

Figure 8A:
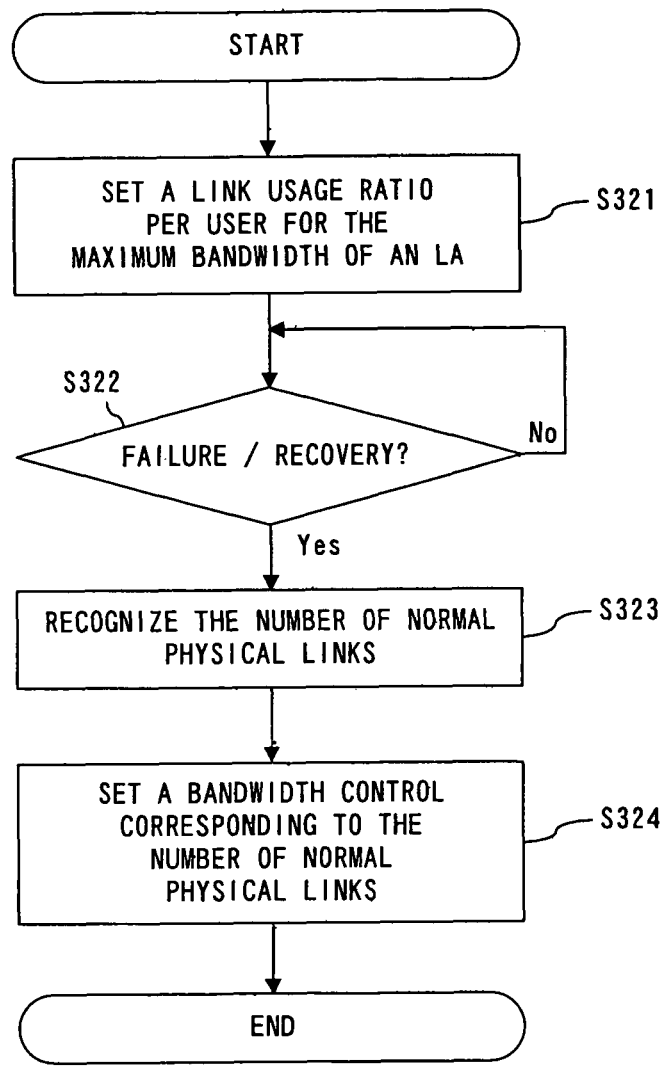
FIG. 8A shows a flow of carrying out a dynamic bandwidth control information setup in a fixed ratio according to the present invention.

FIG. 8A describes a process flow of firmware carrying out a dynamic bandwidth control information setup with a fixed link usage ratio in accordance with a Link Aggregation reconfiguration.

The first step is to preset a link usage ratio per user for the maximum bandwidth of the Link Aggregation (S321). The ensuing steps are the same as the flow shown by FIG. 7A, that is, at the time of detecting occurrence of a failure, or recovery therefrom, of a physical link which is integrated as a Link Aggregation (S322), recognize the number of currently normal physical links (S323), and increase or decrease the bandwidth for each user based on the ratio which has been pre-set in the step S321 thereby re-setting the bandwidth control setup corresponding to the number of normal physical links for the hardware (S324).

FIG. 8B exemplifies a bandwidth control information setup with a fixed ratio for each user in the step S321 shown by FIG. 8A. In the example shown by FIG. 8B, since the link usage ratios of the users A and B are 50% respectively, the same bandwidth control result as shown by FIG. 7B is obtained as a result. But, the link usage ratio shall not necessarily be the same for each user and the present invention is of course applicable if the aforementioned ratio is different from one user to the next.

The above described method shown by FIG. 7A or FIG. 8A makes it possible to prevent a specific user from dominating the bandwidth, by re-setting the bandwidth control dynamically in accordance with Link Aggregation reconfiguration.

The next description is a detailed description of re-setting a bandwidth control dynamically in accordance with Link Aggregation reconfiguration according to the present invention.

Figure 2:
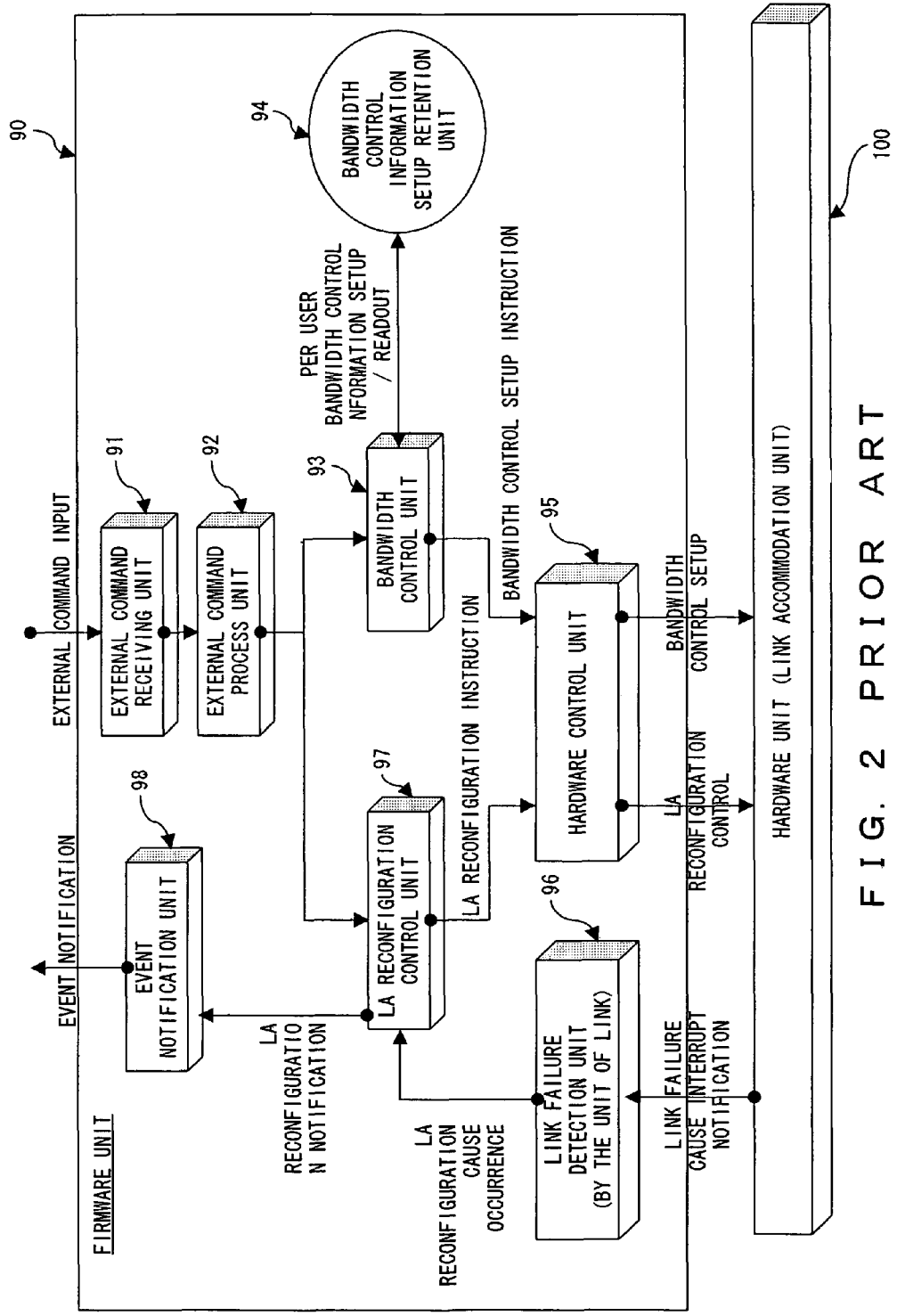
FIG. 2 shows a conventional system block diagram.
Figure 9:
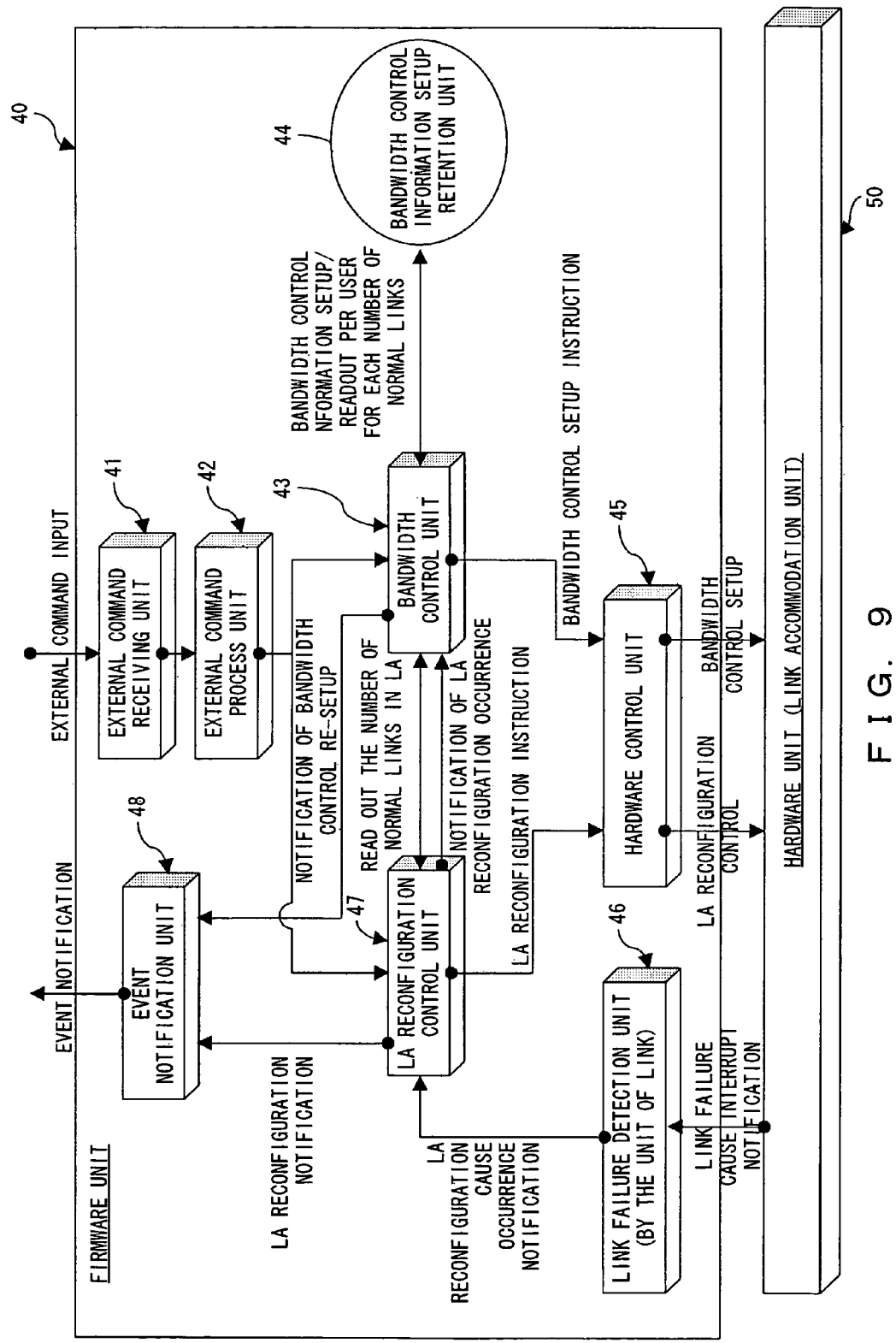
FIG. 9 is a system block diagram of transmission equipment to which the present invention is applied.

FIG. 9 shows a hardware unit 50 accommodating physical links and a firmware unit 40, which is the same as the earlier described FIG. 2. The firmware unit 40 is the same as the one shown by FIG. 2 in terms of the functional block configuration, except that some functions for re-setting the bandwidth control per user are added. The hardware unit 50 is the same as the one shown by FIG. 2.

Figure 10:
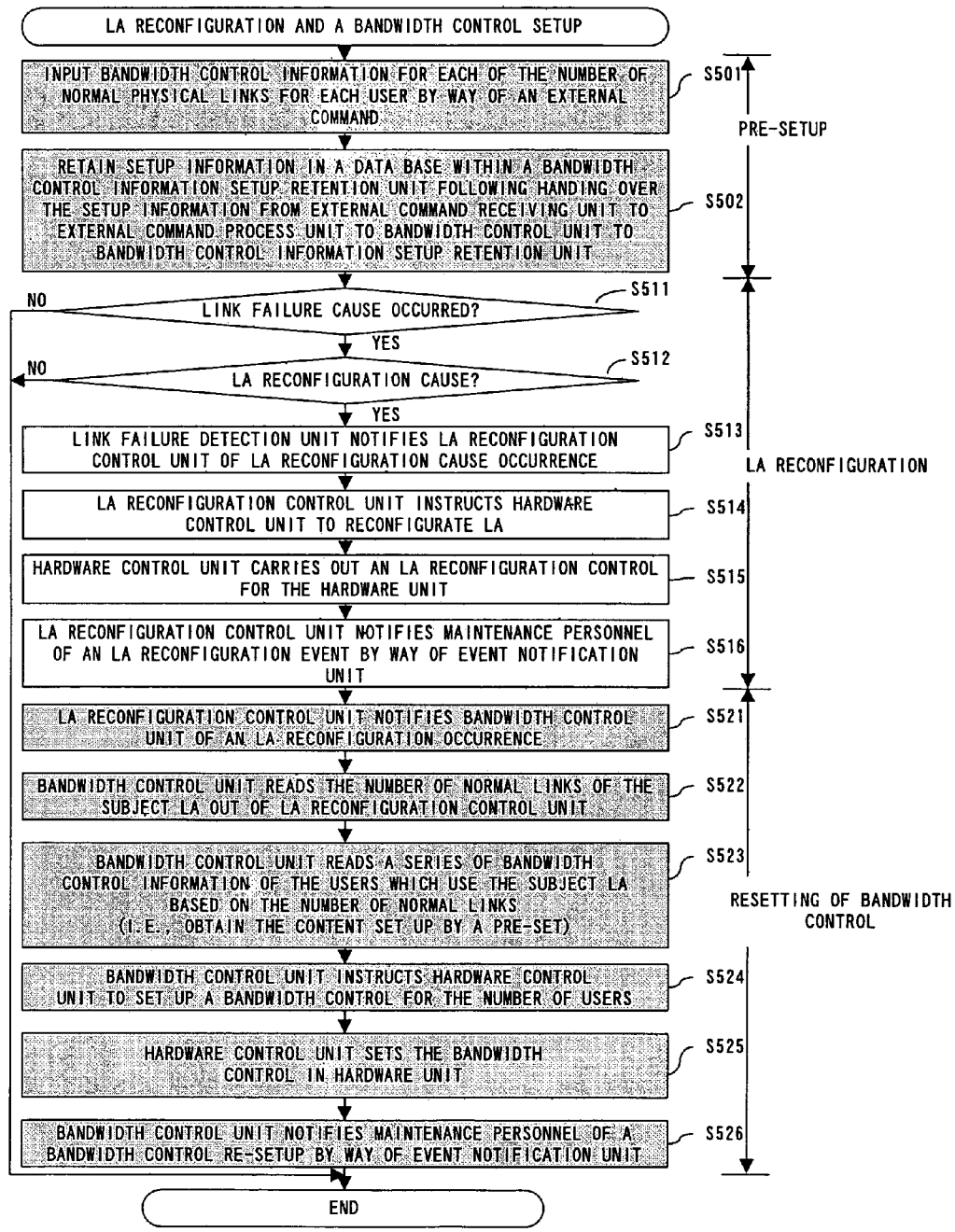
FIG. 10 shows LA reconfiguration and a bandwidth control setup flow according to the present invention.

FIG. 10 describes in further detail a re-setting flow, shown by FIG. 7A, of a dynamic bandwidth control for a Link Aggregation in the case of failure occurrence in a physical link. Although the flow shown by FIG. 8A is not particularly described in detail here, persons skilled in the art of the field of the present invention will be easily capable of understanding it by analogy.

Figure 3:
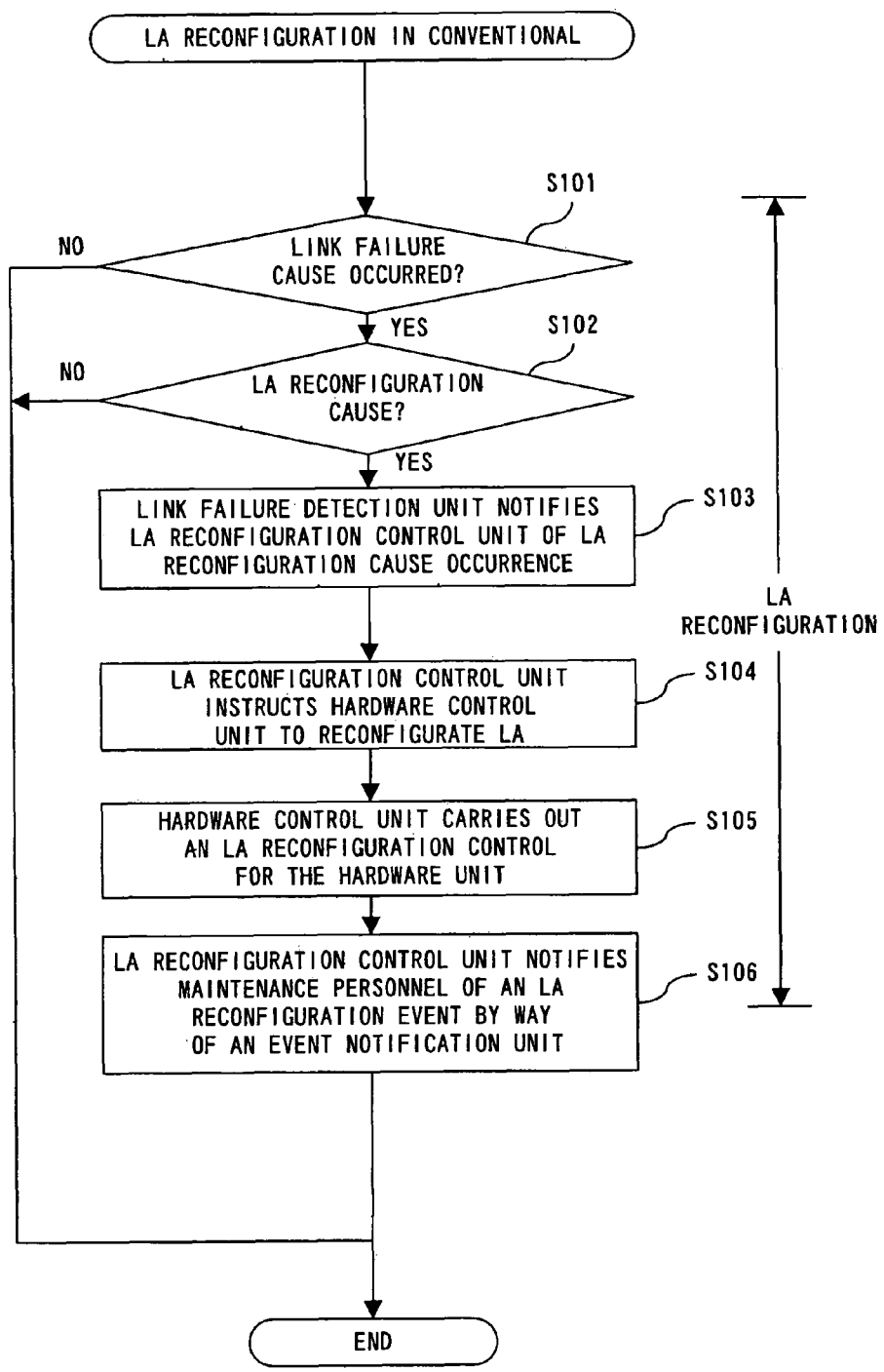
FIG. 3 shows a conventional LA reconfiguration flow.

Comparing the flow shown by FIG. 10 with the link reconfiguration flow shown by FIG. 3, the LA reconfiguration stage is the same, except that pre-setup and bandwidth control re-setup stages have been added to the former.

In the pre-setup stage, the first process is to input bandwidth control information for each of the number of normal physical links for each user by way of an external command (S501) The input external command is received by an external command receiving unit 41 and the bandwidth control information is retained by a database within a bandwidth control information setup retention unit 44 by way of an external command process unit 42 and bandwidth control unit 43 (S502).

Following the pre-setup, the flow of LA reconfiguration from the monitoring of a link failure cause occurrence (S511) to the notification of an LA reconfiguration event (S516) is the same as the flow shown by FIG. 3, specifically between the S101 through S106.

The present invention is configured to re-set a bandwidth control based on a pre-setup, in addition to LA reconfiguration.

As shown by FIGS. 9 and 10, an LA reconfiguration control unit 47 notifies a bandwidth control unit 43 of an LA reconfiguration occurrence, in addition to the conventional link reconfiguration instruction to the hardware control unit 45 (S521). Having been notified of the LA reconfiguration occurrence, the bandwidth control unit 43 reads the number of normal physical links of an LA as the subject of LA reconfiguration out of the LA reconfiguration control unit 47 (S522).

Then the bandwidth control unit 43 reads a series of bandwidth control information of the users which use the LA as the subject of LA reconfiguration out of the bandwidth control information setup retention unit 44 based on the number of normal physical links read out in the step S522 (S523) and instructs the hardware control unit 45 to set up a bandwidth control based on the readout bandwidth control information (S524).

The hardware control unit 45 sets the instructed bandwidth control setup in the hardware unit 50 to carry out a bandwidth control for each user (S525), specifically by setting the value exemplified by FIG. 7B in the bandwidth control-use register comprised by the hardware unit 50.

The bandwidth control unit 43 notifies an event notification unit 48 of a bandwidth control re-setup and the event notification unit 48 notifies a network monitor apparatus 29 of the event so that maintenance personnel may be notified of the bandwidth control re-setup (S526).

By the above described process flow shown by FIG. 10, a setup value for a bandwidth control for each user is re-set so that the hardware unit 50 carries out a bandwidth control based on the re-set bandwidth control-use setup value.

Incidentally, in the case of pre-setting a link usage ratio for each user corresponding to the maximum bandwidth of a Link Aggregation as shown by FIGS. 8A and 8B, all that is required is for the bandwidth control unit 43 to calculate a usable bandwidth for each user based on the number of normal physical links and the link usage ratio per user to request a bandwidth control setup.

As described in detail above, the present invention carries out a dynamic bandwidth control setup at the time of a failure occurrence, or recovery therefrom, in each of the physical links which are integrated as a Link Aggregation by the function (constituted by the external command receiving unit 41 and external command process unit 42) capable of re-setting bandwidth control information for each user for each of a number of normal physical links which are integrated as a Link Aggregation or by the one (constituted by the external command receiving unit 41 and external command process unit 42) capable of setting bandwidth control information, in a fixed ratio, for each user for each of the number of physical links which are integrated as a Link Aggregation; the one (constituted by the external command receiving unit 41, external command process unit 42, bandwidth control unit 43 and bandwidth control information setup retention unit 44) for retaining the aforementioned setting for each user and each of the number of normal physical links; the one (i.e., the link failure detection unit 46) capable of detecting a link failure cause (e.g., a physical link failure within the transmission equipment itself, a link-down due to a failure in the opposite side equipment, et cetera); the one (constituted by the LA reconfiguration control unit 47 and hardware control unit 45) for processing link reconfiguration in units of Link Aggregation; and the one (constituted by the LA reconfiguration control unit 47, bandwidth control unit 43, bandwidth control information setup retention unit 44 and hardware control unit 45) for carrying out a bandwidth control setup for each user in accordance with Link Aggregation reconfiguration.

Therefore, the present invention makes it possible to prevent unfairness among the users by re-setting a bandwidth control for each user in accordance with Link Aggregation reconfiguration due to a failure occurrence of a physical link.

And an application of the present invention requires merely an addition of functionality to the firmware, while requiring no addition of functionality to the hardware. And, with regard to the addition of functionality to the firmware, only the addition of interfaces among the conventionally existing functional blocks is required, thereby enabling easy application to existing systems.

What is claimed is:

1. A bandwidth control method for controlling dynamically a bandwidth control setup, the method comprising:

presetting in transmission equipment, a table indicating a correspondence relationship among a plurality of maximum bandwidths of user traffic of a plurality of users using a Link Aggregation to integrate a plurality of physical links and the number of normal physical links which are integrated as the Link Aggregation, as bandwidth control information of each user for the number of normal physical links, a total of the plurality of maximum bandwidths representing a maximum bandwidth of the Link Aggregation based on a bandwidth of a physical link multiplied by the number of normal physical links, one of the normal physical links transmitting a sum of a plurality of parts of the user traffic respectively corresponding to the plurality of users;

recognizing, by the transmission equipment, the number of currently normal physical links if a failure, or a recovery therefrom, of physical links which are integrated as the Link Aggregation is detected;

carrying out a bandwidth control, by the transmission equipment for each user traffic in response to the number of the recognized normal physical links by referring to the preset table; and controlling, by the transmission equipment, the maximum bandwidths of user traffic dynamically in accordance with a variation of a maximum bandwidth of the Link Aggregation, wherein the controlling the maximum bandwidths of user traffic decreases the maximum bandwidths of user traffic to smaller maximum bandwidths corresponding to the number of the recognized normal physical links when the failure of the physical links is detected, and increases the maximum bandwidths of user traffic to greater maximum bandwidths corresponding to the number of the recognized normal physical links when the recovery of the physical links from the failure is detected.

2. The bandwidth control method according to claim 1, wherein each of the maximum bandwidths of user traffic is a link usage ratio for each user traffic relative to the maximum bandwidth of said Link Aggregation.

3. The bandwidth control method according to claim 1, wherein the setting sets the maximum bandwidths of user traffic output from the transmission equipment.

4. Transmission equipment to control dynamically a bandwidth control setup, the transmission equipment comprising:

a unit to preset a table indicating a correspondence relationship among a plurality of maximum bandwidths of user traffic of a plurality of users using a Link Aggregation to integrate a plurality of physical links and the number of normal physical links which are integrated as the Link Aggregation, as bandwidth control information of each user for the number of normal physical links, a total of the plurality of maximum bandwidths representing a maximum bandwidth of the Link Aggregation based on a bandwidth of a physical link multiplied by the number of normal physical links, one of the normal physical links transmitting a sum of a plurality of parts of the user traffic respectively corresponding to the plurality of users;

a unit to retain the preset table;

a unit to detect a link failure cause of physical links accommodated in the transmission equipment;

a unit to carry out a Link Aggregation reconfiguration processing in units of the Link Aggregation; and a unit to carry out a bandwidth control setup of each user traffic in accordance with a Link Aggregation reconfiguration, wherein the transmission equipment carries out a dynamic bandwidth control setup for each user traffic in response to the number of currently normal physical links by referring to the preset table at the time of a failure, or a recovery therefrom, of each physical link which is integrated as the Link Aggregation, and controls the maximum bandwidths of user traffic dynamically in accordance with a variation of a maximum bandwidth of the Link Aggregation so as to decrease the maximum bandwidths of user traffic to smaller maximum bandwidths corresponding to the number of the currently normal physical links when the failure of each physical link is detected, and so as to increase the maximum bandwidths of user traffic to greater maximum bandwidths corresponding to the number of the currently normal physical links when the recovery of each physical link from the failure is detected.

5. The transmission equipment according to claim 4, wherein each of the maximum bandwidths of user traffic is preset by a fixed ratio.

6. Transmission equipment comprising:

a bandwidth control information setup retention unit to retain a table indicating a correspondence relationship among a plurality of maximum bandwidths of user traffic of a plurality of users using a Link Aggregation to integrate a plurality of physical links and the number of normal physical links which are integrated as the Link Aggregation, as bandwidth control information of user traffic of the plurality of users, a total of the plurality of maximum bandwidths representing a maximum bandwidth of the Link Aggregation based on a bandwidth of a physical link multiplied by the number of normal physical links, one of the normal physical links transmitting a sum of a plurality of parts of the user traffic respectively corresponding to the plurality of users;

a bandwidth control unit to instruct a bandwidth control setup by reading the table retained by the bandwidth control information setup retention unit;

a link failure detection unit to receive an interrupt notification as a result of a link failure cause occurrence when a failure of each physical link is detected and to notify of an occurrence of reconfiguration cause of the Link Aggregation;

a Link Aggregation reconfiguration control unit to instruct Link Aggregation reconfiguration based on the notification of the Link Aggregation reconfiguration cause occurrence notification issued by the link failure detection unit; and a hardware control unit to carry out a bandwidth control setup based on the bandwidth control setup instruction issued by the bandwidth control unit and for controlling Link Aggregation reconfiguration based on the Link Aggregation reconfiguration instruction by the Link Aggregation reconfiguration control unit, wherein the bandwidth control unit sets the table in the bandwidth control information setup retention unit based on an externally input command; and the Link Aggregation reconfiguration control unit notifies the bandwidth control unit of the Link Aggregation reconfiguration occurrence based on the Link Aggregation reconfiguration occurrence notification issued by the link failure detection unit, the bandwidth control unit reads the number of normal physical links of the Link Aggregation as the subject of reconfiguration out of the Link Aggregation reconfiguration control unit and instructs a bandwidth control setup for each user traffic by reading maximum bandwidths of user traffic corresponding to the read number of normal physical links out of the table, based on the Link Aggregation reconfiguration occurrence notification, so as to decrease the maximum bandwidths of user traffic to smaller maximum bandwidths corresponding to the read number of normal physical links when the failure of each physical link is detected, and so as to increase the maximum bandwidths of user traffic to greater maximum bandwidths corresponding to the read number of normal physical links when a recovery of each physical link from the failure is detected.

7. The transmission equipment according to claim 6, wherein said bandwidth control unit sets the table in said bandwidth control information setup retention unit, the maximum bandwidths of user traffic for the number of normal physical links according to a Link Aggregation usage ratio of each user provided by said command.

8. The transmission equipment according to claim 6, further comprising an event notification unit, wherein said bandwidth control unit notifies the event notification unit of a bandwidth control re-setup, and the event notification unit notifies an external apparatus of an event of a bandwidth control re-setup.

* * * * *